United States Patent [19]
Murry et al.

[11] Patent Number: 5,159,218
[45] Date of Patent: Oct. 27, 1992

[54] MOTOR WITH INTEGRAL CONTROLLER

[75] Inventors: Roger P. Murry; Dong T. Le, both of Los Angeles, Calif.

[73] Assignee: Allied-Signal Inc., Morris Township, Morris County, N.J.

[21] Appl. No.: 727,516

[22] Filed: Jul. 9, 1991

[51] Int. Cl.$^5$ .............................................. H02P 5/00
[52] U.S. Cl. ................................ 310/68 B; 310/68 R; 388/800
[58] Field of Search ............... 310/68 B, 68 R, 177; 318/16, 17, 599, 600, 606, 254; 388/800, 935; 417/14, 18–24, 278, 279, 326

[56]           References Cited
U.S. PATENT DOCUMENTS 4,221,998  9/1980  Haught et al. ................. 318/661
4,371,818  2/1983  Lewis .............................. 318/313
4,773,829  9/1988  Vettori ............................ 417/366
4,949,021  4/1990  Rozman et al. ................ 318/254
5,019,757  5/1991  Beifus ............................. 318/254

Primary Examiner—R. Skudy
Assistant Examiner—Judson H. Jones
Attorney, Agent, or Firm—Hugh P. Gortler; Robert A. Walsh

[57]           ABSTRACT

A solid state controller is mounted directly to a permanent magnet, brushless DC motor. The controller operates the motor at constant torque and variable speed. Speed is determined in accordance with density of the through flow. The motor and controller can be employed to circulate fluid in a circulation loop having variable pressure.

14 Claims, 4 Drawing Sheets

MOTOR WITH INTEGRAL CONTROLLER

FIELD OF THE INVENTION

The present invention relates in general to apparatus for controlling electric motors and in particular to a permanent magnet, brushless DC motor with integral controller.

BACKGROUND OF THE INVENTION

Controllers for electric motors are typically large, bulky devices. The industry standard is to mount the controller apart from the motor.

In certain environments, the separation of the controller from the motor leads to several undesirable consequences. For instance, in environments in which high RF fields are present, the conductors connecting the motor to the controller act as antennae that pick up the RF signals. As a result, these conductors must be shielded against this electromagnetic interference. In environments such as outer space, the conductors are subject to inductive heating. Because heat cannot be dissipated into a vacuum, the conductors and connectors burn. Therefore, heat sinks must be provided to dissipate the heat from the conductors and connectors.

In certain applications, the bulkiness of the controller and the above-mentioned problems make it impractical to use. For instance, a controller is impractical to use in a Portable Life Support System (PLSS) for an EVA suit. Among its many functions, the PLSS provides an astronaut with an oxygen/nitrogen atmosphere in which to breathe. As the astronaut exhales, he expels carbon dioxide into his helmet. To maintain the oxygen/nitrogen atmosphere, the PLSS removes carbon dioxide from the helmet through a closed loop ventilation. A motor-driven fan circulates the carbon dioxide within the ventilation loop. To avoid using a controller for the fan, the motor is operated at a fixed speed.

Yet, by fixing motor speed, other problems arise. During a space mission, gas pressure can vary from 19.5 psia down to 6 psia, a variation of better than 3:1. As the pressure is doubled, for example, the mass flow is also doubled. Because the speed of the motor is fixed, the increase in pressure causes a mass flow that is greater than necessary. Thus, higher pressures cause a significant energy drain on the battery pack. Higher pressures can also result in ventilation mass flow rates that are higher than desired.

Therefore, it is an object of the present invention to provide a motor with an integral controller.

It is a further object of the present invention to provide an integral controller that operates a brushless motor at constant torque and variable speeds for use in a circulation loop under variable pressure.

SUMMARY OF THE INVENTION

A solid-state controller is mounted on a brushless motor requiring low input power. This eliminates the need for shielding against EMI and heat sinks for dissipating heat.

The motor with integral controller can be used in circulation loops under variable pressure. The controller maintains constant current to the permanent magnet drive motor with resulting fan speed being determined by density of the through flow. The variable speed constant current feature allows the fan maximum performance operating line to match the circulation loop load line as the loop pressure is varied.

DETAILED DESCRIPTION OF THE PREFERRED EMBODIMENT

Figure 1:
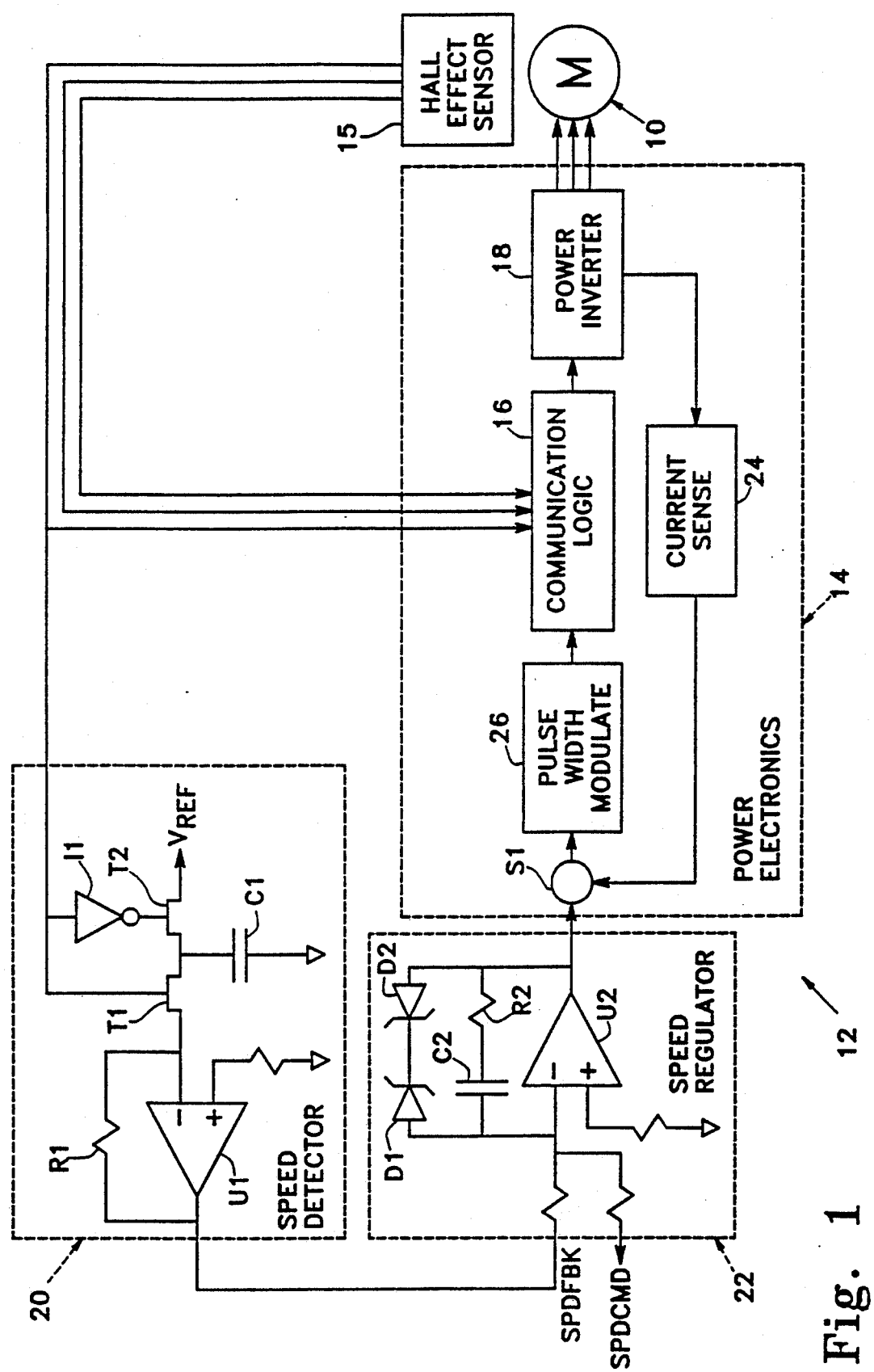
FIG. 1 is a block diagram of the motor with integral controller.

Referring now to FIG. 1, there is shown a block diagram of a motor 10 and an integral controller 12 which controls motor speed. The motor 10 is a permanent magnet, brushless DC motor. As a prerequisite, the motor 10 must have a low input power. The permanent magnet motor 10 can be made small because the permanent magnet maintains electromagnetic efficiency at speeds of three to four times higher than even the most advanced induction drive motor 16. This allows the fan aerodynamics to be optimized for high speed axial flow geometry.

Because the motor 10 has a low power consumption, the controller 12 can be a solid-state device that is fabricated on only a few chips. This allows the motor 10 and controller 12 to be packaged into a compact unit.

The controller 12 includes power electronics 14. The power electronics 14 receives positional signals from three position sensors 15, such as Hall-effect devices, which sense the angular orientation of the rotor of the motor 10. Outputs of the position sensors 15 are supplied to commutation logic 16, which provides commutation commands in response to the orientation of the rotor. The commutation commands direct an FET-based inverter 18 to provide chopped up input power to appropriate stator windings of the motor 10, thereby causing the rotation of the rotor.

An output of one the position sensors 15 is supplied to a speed detector 20, which converts the position signal to a signal indicative of speed. The output of the position sensor 15 is connected to the gate of a first FET T1 and coupled to the gate of a second FET T2 via an inverter I1. When the rotor is not in proximity of the position sensor 15, the position sensor 15 provides a low signal, which causes the first FET T1 to conduct and the second FET T2 not to conduct. As a result, the capacitor C1 is charged by voltage Vref. When the rotor is in proximity of the position sensor 15, the position sensor 15 provides a high signal, which causes the second FET T2 to conduct and the first FET T1 not to conduct. As a result, the capacitor C1 is discharged, providing a current pulse into the inverting input of a first operational amplifier U1. As the rotational speed of the rotor increases, the frequency of current pulses supplied to the first operational amplifier U1 also increases. The amplitude of the current pulses are all the same. Thus, for higher switching rates, the average 5 current supplied to the first operational amplifier U1 is increased. Average current is defined by the following relationships:

$$I_{ave} = Q/T = C \cdot V_{ref}/T = C \cdot V_{ref} f_{clk}$$

where C is capacitance of capacitor C1, Vref is the reference voltage, and $f_{clk}$ is the frequency of the current pulses. From these relations, $$Req = Vref/I_{ave} = 1/C f_{clk}$$

where Req is an equivalent resistance caused by squeaking the capacitor C1. Thus, when the capacitance C of capacitor C1 is constant, the equivalent resistance Req is inversely proportional to the frequency $f_{clk}$ of the current pulses. The operational amplifier U1 amplifies the input signal by a negative gain that is determined by resistor R1 and the equivalent resistance Req, and thereby furnishes an output signal that is proportional to the speed of the rotor. This output signal SPDFBK indicates the speed feedback.

The output of the speed detector 20 is supplied to a speed regulator 22, which regulates the motor 10 at a commanded speed. A speed command SPDCMD, supplied by an external source (not shown), is added to the speed feedback signal SPDFBK at a summing point S1. The output of the summing point S1 furnishes an error signal, which is supplied to the inverting input of a second operational amplifier U2. The second operational amplifier U2 is configured to operate as a proportional integral controller. The proportional integral controller integrates out transients in the error signal to improve stability of the system. Proportional integral differentials are well known to those skilled in the art. Back-to-back zener diodes D1 and D2 function to clip the voltage between upper and lower limits. A current command is furnished on an output of the second operational amplifier U2.

A feedback current is measured by a motor current sensor 24. Outputs from the current sensor 24 and second operational amplifier U2 are coupled to respective inputs of a subtracter S1, whose output furnishes an error signal referenced to the assigned control current. The error signal is supplied to a pulse width modulator 26, which controls the speed of the motor 10. By controlling the "on" time for commutation logic 16, the pulse width modulator 26 maintains assigned current control, developing constant torque in the motor 10 as a result.

The power electronics 14, including the commutation logic 16, inverter 18, current sensor 24, pulse width modulator 26 and subtracter S1, can be fabricated on a single chip. Such a chip can be a UDN 2936, manufactured by Unitrod. Such a chip is also available from Allied-Signal, Inc. the assignee of the present invention. The power electronics 14 allows motor current to be set by an operator within a given range of motor torque.

Chips for the power electronics 14, speed detector 20 and speed regulator 22 are mounted to a single breadboard. The controller 12 is mounted directly to the motor 10.

An electrical interface (not shown) provides signals such as DC input power and on/off and torque/speed command links (e.g., the speed command SPDCMD). This simplifies any shielding for EMI since external ac wiring is eliminated. In an alternate embodiment, speed can be controlled through a closed loop.

Figure 2:
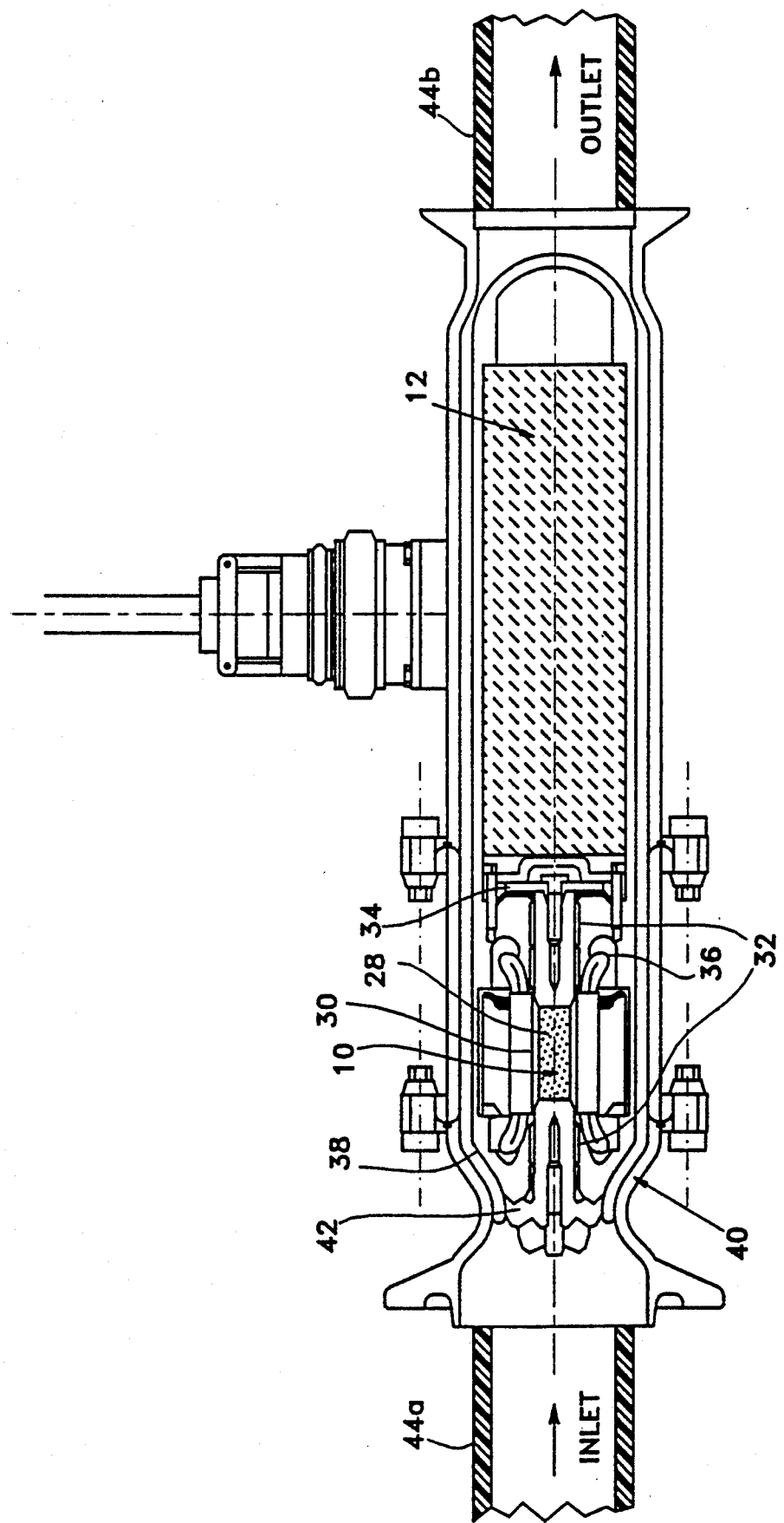
FIG. 2 is a cross-sectional view of a fan with integral controller according to one application.

Referring now to FIG. 2, the motor 10 and 0 controller 12 are shown as part of a PLSS. It should be noted that a circulation loop for the PLSS is but one application for the present invention.

In this application, the motor 10 has a rotor 28 that includes a two-pole permanent magnet made of samarium cobalt rare-earth. The magnet is trapped inside a support sleeve 30 in the middle of the rotor 28. The sleeve 30 is installed with sufficient interference to ensure that the magnet is held in compression over all speed and temperature conditions. This configuration also provides the mechanical stiffness needed to operate at a maximum fan speed of 190,000 rpm. The rotor 28 is supported by bearings such as self-acting gas (compliant foil) bearings. These bearings include journal bearings 32 and thrust bearings 34. The compliant foil bearings prevent contamination from the surrounding environment. The stator 36 of the motor 10 has a three-phase winding that incorporates full phase-to-phase and turn-to-turn insulation. An insulator also separates the winding from a laminated flux containment ring. The stator 36 is supported by a back iron ring that completes the electromagnetic circuit. Such a motor 10 is well known to those skilled in the art. See, for example, U.S. Pat. 4,667,123 (permanent magnet rotor); and U.S. Pat. No. 4,709,180 (stator assembly). The journal be are described in U.S. Pat. Nos. 4,153,315, 4,435,839, and 4,701,060. The thrust foil bearings are disclosed in U.S. Pat. Nos. 4,616,583 and 4,668,106 and are assigned to Allied-Signal, Inc. the assignee of the present invention.

A clamshell housing 38 of the controller 12 mates with the motor 10 to first make all electrical connections. Then, the lid of the clamshell housing 38 is closed, and the clamshell 38 is inserted into an assembly housing 40. An impeller 42 is mounted on one end of the rotor 28, which is at the inlet of the assembly housing 40. The motor 10 turns the impeller 42 at high rotational speeds needed for efficient axial flow. High speeds lead to proportional decrease in drive torque and, therefore, the size of its motor 10. The controller 12 is mounted in the tailcone of the assembly housing 40, downstream the motor 10.

The assembly housing 40 is interposed between two sections of a tube 44a and 44b, which provide a circulation path for fluid to flow from the PLSS. The outer diameter of the assembly housing 40 nearly matches that of the tubing 44a and 44b. Both the controller 12 and motor 10 are cooled by the discharge flow that wets the inner wall of the assembly housing 40. The motor 10 circulates a fluid medium through the assembly housing 40, and the controller 12 supplies a current to the motor 10, which controls its torque. As a result, the fluid cools the controller 12 and all related conductors and connectors. Thus, the need for a heat sink is eliminated.

Figure 3:
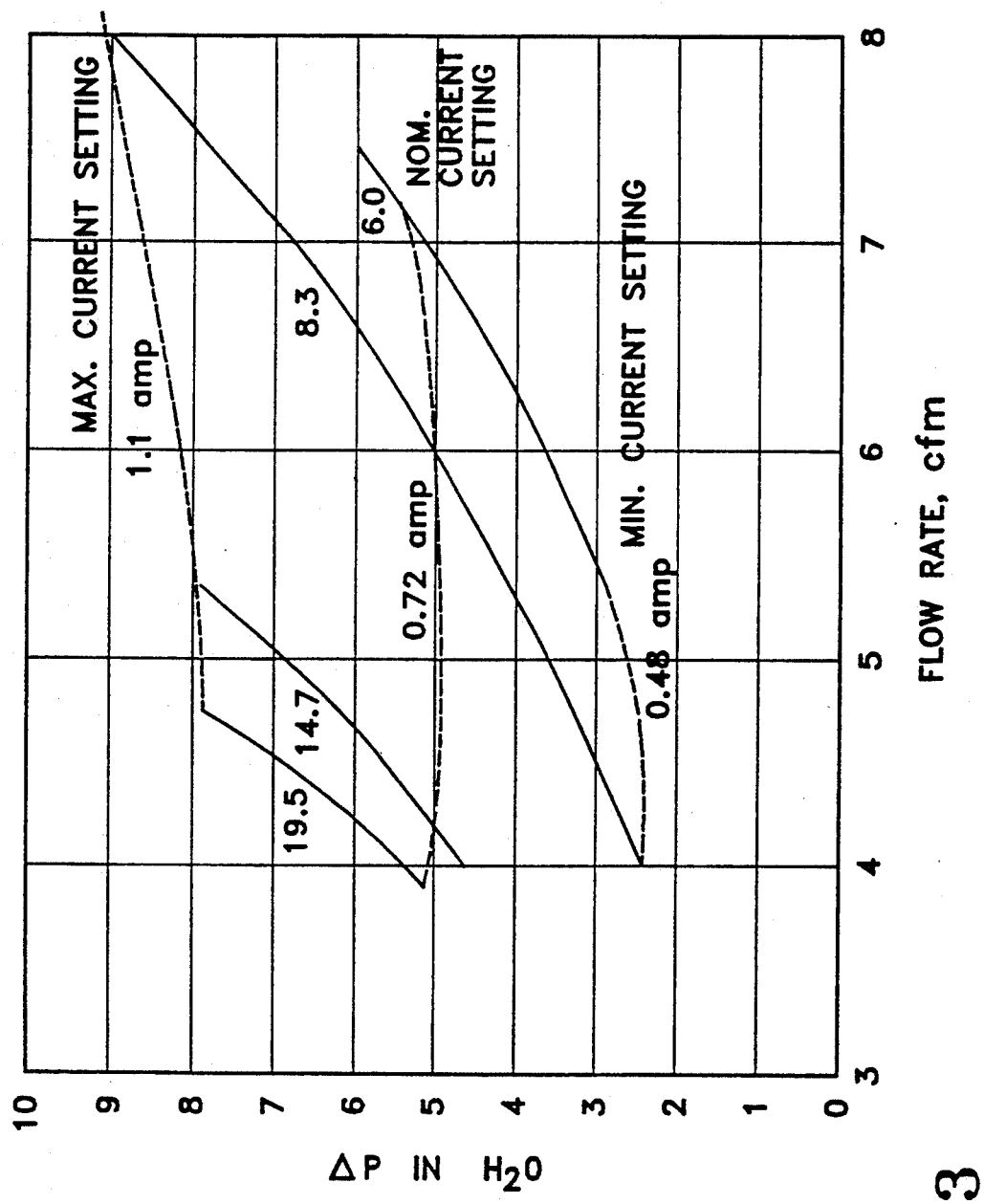
FIG. 3 is a graph of flow rate as a function of suit pressure and current setting.

For open loop operation, a speed controller, such as a potentiometer, is mounted externally the assembly housing 40. The motor 10, driven by the power electronics 14, develops constant torque for a given current command. The constant torque motor compensates for variation in load by allowing speed to vary to match the load. A decrease in load allows for higher speed, and an increase in load allows for lower speed. For driving a ventilation loop fan, the motor load varies with ventilation loop pressure. The fan motor compensates for variation in ventilation loop pressure by varying speed with the fan load according to a $1/\sqrt{p}$ relationship, where $p$ is the density of the gas in the ventilation loop. The variation in fan speed also causes the fan flow and pressure ratio to vary. For a ventilation loop of fixed geometry, the fan performance can be mapped as shown in FIG. 3 in terms of fan flow in cubic feet/minute (CFM) and pressure rise $\Delta P$, in inches of water. The map separately identifies the effect of ventilation loop pressure, which determines fan load and motor current level, which determines fan motor torque. In the basic operating mode the current command remains fixed at the 0.72 amp nominal current setting. As the ventilation loop pressure varies from 19.5 psia to 6.0 psia the fan will operate along the 0.72 amp current line. The 3.9 CFM (0.40 lb/min) flow at 19.5 psia increases to 7.3 CFM (0.23 lb/min) at 6 psia loop pressure as the fan is allowed to speed up to maintain a constant load torque. The increase in speed and volumetric flow rate helps to maintain mass flow (lb/min) as the density in the loop falls off. A 3.16:1 drop in density results in only a 1.74:1 drop in mass flow. This drop-off in speed with loop pressure reduces motor power draw. As a result, the drain on the battery is minimized. Simulation studies show the battery size required for the normal mission is reduced by 10 percent compared to a traditional constant speed fan.

Figure 4:
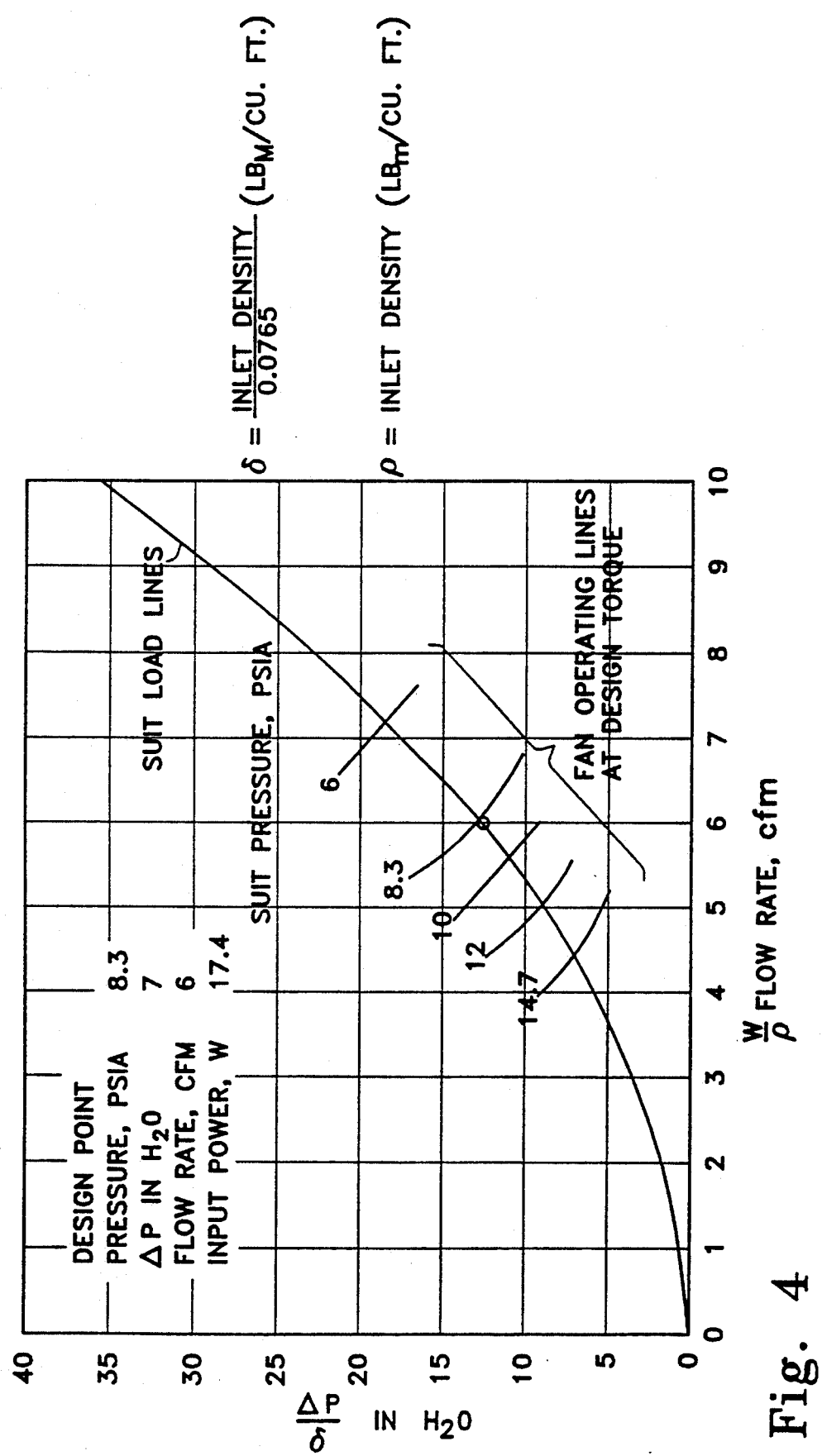
FIG. 4 is a fan operating map at design torque.

When operating at design torque, the fan flows are maintained at an optimum rate for aerodynamic efficiency as the ventilation loop pressure varies. This is shown in FIG. 4.

In the back-up operating mode the current command can be changed if more or less fan performance is needed. For the PLSS, during periods of high exertion the astronaut may require higher ventilation rates to maintain a proper CO2 purging in the helmet.

In an alternate embodiment, the controller 12 uses a feedback loop to establish a fan speed, with motor current being determined by density of the through flow. Additional instrumentation in the form of a pressure transducer is needed to provide input to a controller speed schedule.

It will be understood that the embodiments described herein is merely exemplary and that a person skilled in the art may make many variations and modifications without departing from the spirit and scope of the invention. All such modifications are intended to be included within the scope of the invention as defined in the appended claims.

What is claimed is:

1. A combination comprising an electric motor requiring low input power; and solid-state controller means, mounted on said motor, including:
   commutation means for commutating current through selected stator windings of said motor,
   command means for generating a current command indicating an amount of current that should be flowing through said selected stator windings, and
   closed loop current means, responsive to said current command, for maintaining said current flowing through said selected stator windings at said amount commanded by said current command.

2. The combination according to claim 1, further comprising a housing having first and second halves, wherein said motor and controller means are located within said first half such that said motor and said controller means are mated to make all electrical connections therebetween, and wherein said second half mates with said first half to encase said motor and said controller means.

3. The combination according to claim 1, wherein said closed loop current means includes current feedback means, responsive to said stator windings, for indicating the amount of current flowing through said selected windings, an output of said current feedback means furnishing a feedback current; error signal means for taking the difference of said current command and said feedback current; and pulse width modulating means, responsive to an output of said error signal means, for pulse width modulating said commutation means to maintain the current in said selected windings at said amount commanded by said current command.

4. The combination according to claim 1, further including at least one position sensor means, responsive to said motor's rotor, for providing square-wave output signals that indicate the orientation of said rotor with respect to said stator; and wherein said controller means further includes speed detector means, responsive to an output of one of said at least one position sensor means, for converting said position signals to feedback speeds, which indicate rotational speed of said rotor.

5. The combination according to claim 4, wherein said speed detector means includes variable resistor means, responsive to said output of said one position sensor means, for providing a resistance that is proportional to the rotational speed of said rotor; and an operational amplifier having one input coupled to an output of said resistor means, and a first resistor coupled between an output of said operational amplifier and an output of said resistor means, whereby a gain of said operational amplifier is varied by a change in rotational speed of said rotor.

6. The combination according to claim 5, wherein said variable resistor means includes a capacitor coupled between said one input of said operational amplifier and and a reference potential; and squeaking means, responsive to said output of said one position sensor means, for providing current pulses to said operational amplifier at a frequency that is proportional to the rotational speed of said rotor.

7. The combination according to claim 4, further including means for providing a speed command and wherein said command means includes closed loop speed means, responsive to said speed feedback and said speed command, for maintaining said motor at a speed commanded by said speed command.

8. The combination according to claim 7, wherein said closed speed loop means includes summing means for summing said speed feedback and said speed command; and converting means, responsive to an output of said summing means, for converting said sum into said current command.

9. The combination according to claim 8, wherein said converting means includes proportional integral controller means, responsive to an output of said summing means, for providing said current command.

10. The combination according to claim 9, wherein said motor is a permanent magnet, brushless DC motor.

11. A combination comprising
   a brushless motor requiring low input power, said motor having a rotor and a stator;
   at least one position sensor means, responsive to said motor, for providing square-wave output signals that indicate the orientation of said rotor with respect to said stator; and
   solid-state controller means, mounted on said motor, for controlling the operation of said motor, said controller means including commutation means, responsive to said square-wave output signals, for commutating power to selected windings of said stator; means for providing a speed error signal; converting means, for converting said speed error signal into a current command; and closed loop current means, responsive to said current command, for maintaining said current flowing through said selected windings at an amount commanded by said current command.

12. A solid state controller for an electric motor providing at least one position sensor signal, each position sensor signal including a stream of pulses whose frequency is proportional to motor speed, said controller comprising;

speed detector means for detecting motor speed, including a first op amp having inverting and non-inverting inputs and an output, first resistor means, coupled between said inverting input and said output of said first op amp, first capacitor means, coupled between said non-inverting input and a reference potential, and squeaking means, responsive to one of said at least one position sensor signals, for squeaking said capacitor, whereby said first op amp provides an output signal proportional to said motor speed;

speed regulator means, responsive to said output signal and to a speed command, for providing current commands; and commutation means, responsive to said current command and said at least one position sensor signal, for commutating power to said electric motor.

13. A controller according to claim 12, wherein said squeaking means includes first and second transistor means having their controlled current paths coupled in series between said inverting input and a source of operating potential, said capacitor means being coupled between said reference potential and a junction of said controlled current paths, said first transistor means having its first current control supplied with said one position sensor signal, said second transistor means having its current control supplied with the complement of said one position sensor signal.

14. A controller according to claim 12, wherein said speed regulator means includes a PID controller which provides said current commands in response to said output signal and to said speed command.

* * * * *

UNITED STATES PATENT AND TRADEMARK OFFICE
CERTIFICATE OF CORRECTION

PATENT NO. : 5,159,218

DATED : October 27, 1992

INVENTOR(S) : Dong Tuan Le and Roger P. Murry

It is certified that error appears in the above-identified patent and that said Letters Patent is hereby corrected as shown below:

Col. 2, line 24: delete "16".

Col. 2, line 62: delete "5".

Col. 3, line 62: delete "0".

Col. 5, line 26: change "C02" to -- $CO_2$ --.

Signed and Sealed this

Fifth Day of October, 1993

BRUCE LEHMAN

*Attest:*

*Attesting Officer*            *Commissioner of Patents and Trademarks*